(12) United States Patent
Zellner

(10) Patent No.: US 9,875,312 B2
(45) Date of Patent: Jan. 23, 2018

(54) SYSTEM AND DEVICES FOR DIGITAL MEDIA DISTRIBUTION

(71) Applicant: AT&T INTELLECTUAL PROPERTY I, L.P., Atlanta, GA (US)

(72) Inventor: Sam Zellner, Dunwoody, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/686,231

(22) Filed: Apr. 14, 2015

(65) Prior Publication Data

US 2015/0220653 A1 Aug. 6, 2015

Related U.S. Application Data

(63) Continuation of application No. 12/947,637, filed on Nov. 16, 2010, now Pat. No. 9,015,067, which is a (Continued)

(51) Int. Cl.
*G06Q 30/00* (2012.01)
*G06F 17/30* (2006.01)
(Continued)

(52) U.S. Cl.
CPC .. *G06F 17/30882* (2013.01); *G06F 17/30017* (2013.01); *G06Q 30/06* (2013.01);
(Continued)

(58) Field of Classification Search
USPC .................................................. 705/26.25
See application file for complete search history.

(56) References Cited

U.S. PATENT DOCUMENTS 5,638,843 A 6/1997 Stefik et al.
6,009,170 A * 12/1999 Sako .................... G11B 19/12
360/27

(Continued)

FOREIGN PATENT DOCUMENTS

GB 2397673 7/2004
JP 2007242041 A * 9/2007 ............. G06F 21/10

OTHER PUBLICATIONS

Veeraraghavan et al. Cobalt: Separating content distribution from authorization in distributed file systems. Jan. 3, 2007. Retrieved online Sep. 11, 2017. https://www.usenix.org/legacy/events/fast07/tech/full_papers/veeraraghavan/veeraraghavan_html/index.html.*

(Continued)

*Primary Examiner* — James A Reagan
(74) *Attorney, Agent, or Firm* — Akerman LLP; Michael K. Dixon; Mammen (Roy) P. Zachariah, Jr.

(57) ABSTRACT

A device includes a memory for storing digital media, a transfer module, and a processor. The media includes first data that associates the media with the device, second data authorizing the device to play back the media, and third data authorizing the device to transfer a copy of the media. A transfer includes transfer data identifying the copy uniquely relative to the device. The processor implements instructions to receive a request to transfer a copy of the media to a peer device, create a copy of the media that includes the first data and the transfer data, and direct the transfer module to transfer the copy to the peer device and send a transaction record including the first data and the transfer data to a server.

20 Claims, 7 Drawing Sheets

Related U.S. Application Data continuation of application No. 11/558,443, filed on Nov. 10, 2006, now Pat. No. 7,860,809.

(51) Int. Cl.
 *G06Q 30/06* (2012.01)
 *H04L 29/08* (2006.01)

(52) U.S. Cl.
 CPC ....... *G06Q 30/0607* (2013.01); *H04L 67/104* (2013.01); *H04L 67/1074* (2013.01); *Y10S 705/904* (2013.01); *Y10S 705/908* (2013.01); *Y10S 705/911* (2013.01)

(56) References Cited

U.S. PATENT DOCUMENTS

| | | |
|---|---|---|
| 7,103,574 B1 | 9/2006 | Peinado et al. |
| 7,120,250 B2 | 10/2006 | Candelore |
| 2004/0220880 A1* | 11/2004 | Stefik .................. G06F 21/10 705/59 |
| 2006/0167882 A1 | 7/2006 | Aydar et al. |
| 2007/0118853 A1* | 5/2007 | Kreitzer ............ H04L 29/06027 725/46 |
| 2007/0219917 A1* | 9/2007 | Liu ...................... G06F 21/10 705/59 |
| 2008/0066181 A1* | 3/2008 | Haveson ............ H04N 21/4788 726/26 |

OTHER PUBLICATIONS

Mercora, http://www.mercora.com/dj.asp, printed Aug. 23, 2005.

* cited by examiner

SYSTEM AND DEVICES FOR DIGITAL MEDIA DISTRIBUTION

RELATED APPLICATIONS

This application is a continuation of U.S. patent application Ser. No. 12/947,637 filed on Nov. 16, 2010, which is a continuation of U.S. patent application Ser. No. 11/558,443, filed on Nov. 10, 2006, now U.S. Pat. No. 7,860,809, both of which are hereby incorporated by reference in their entireties.

FIELD OF THE DISCLOSURE

Embodiments are related to digital media. More particularly, embodiments are related to the distribution of digital media.

BACKGROUND

Digital media has become a primary form of distribution of music, video, news articles, games, and the like. Currently, digital media purchased and used by individuals is usually protected from illegal copying by a restriction on which device can playback the digital media. The playback of the digital media occurs where a license for the digital media is present for the particular device intended for playback and/or for the particular user of the device used for playback. Accordingly, a different user with a different device cannot playback digital media with such restrictions. Such restrictions prevent sharing of the digital media from an initial purchaser to an entity who may also be interested in having a functional copy of the digital media.

The popularity of a particular digital media work is often increased by word of mouth. Initial purchasers may allow another individual to listen, watch, or otherwise experience the playback of a particular digital work on the purchaser's device and the other individual may decide to purchase a copy of the digital media for their device as well. For example, an initial purchaser may allow a friend to listen to a purchased song, and the friend may then wish to obtain a copy of the song as well. However, to prevent illegal copying, restrictions such as those discussed above prevent the song from being copied for use by the friend, so the friend must go through the normal channels of distribution to obtain a licensed copy of the song that the friend may playback.

Requiring the friend to go through the normal channels of distribution may result in the friend not following through with the purchase of the digital media. For example, the friend may choose not to do so due to the effort required or may simply forget to do so at some later time. Furthermore, the initial purchaser is given no motivation to encourage the friend to follow through with obtaining a licensed copy of the digital media. Accordingly, the number of transfers, and particularly purchases, for a given digital media work suffer.

DETAILED DESCRIPTION OF THE DRAWINGS

Embodiments provide for a brokerage model to be established for the distribution of digital media by utilizing initial recipients of the digital media as the distribution force. Accordingly, word of mouth between peers regarding a particular digital media work becomes a transfer and a potential sales transaction, rather than relying on the interested entity to subsequently make a transfer and possibly a purchase through normal channels of distribution that are unrelated to the interaction with the initial recipient. Transfers may thereby occur at the moment the initial purchaser is demonstrating the digital media to the interested entity, and the initial purchaser may be compensated for the transfer so that the initial recipient is motivated to demonstrate the digital media and to encourage other entities to obtain a licensed copy. The licensed copy may be obtained via a direct transfer from the device of the initial recipient to that of the interested entity as a descendant of the licensed copy of the initial recipient or by the device of the interested entity accessing a network link that is provided by and associated with the initial recipient.

Figure 1:
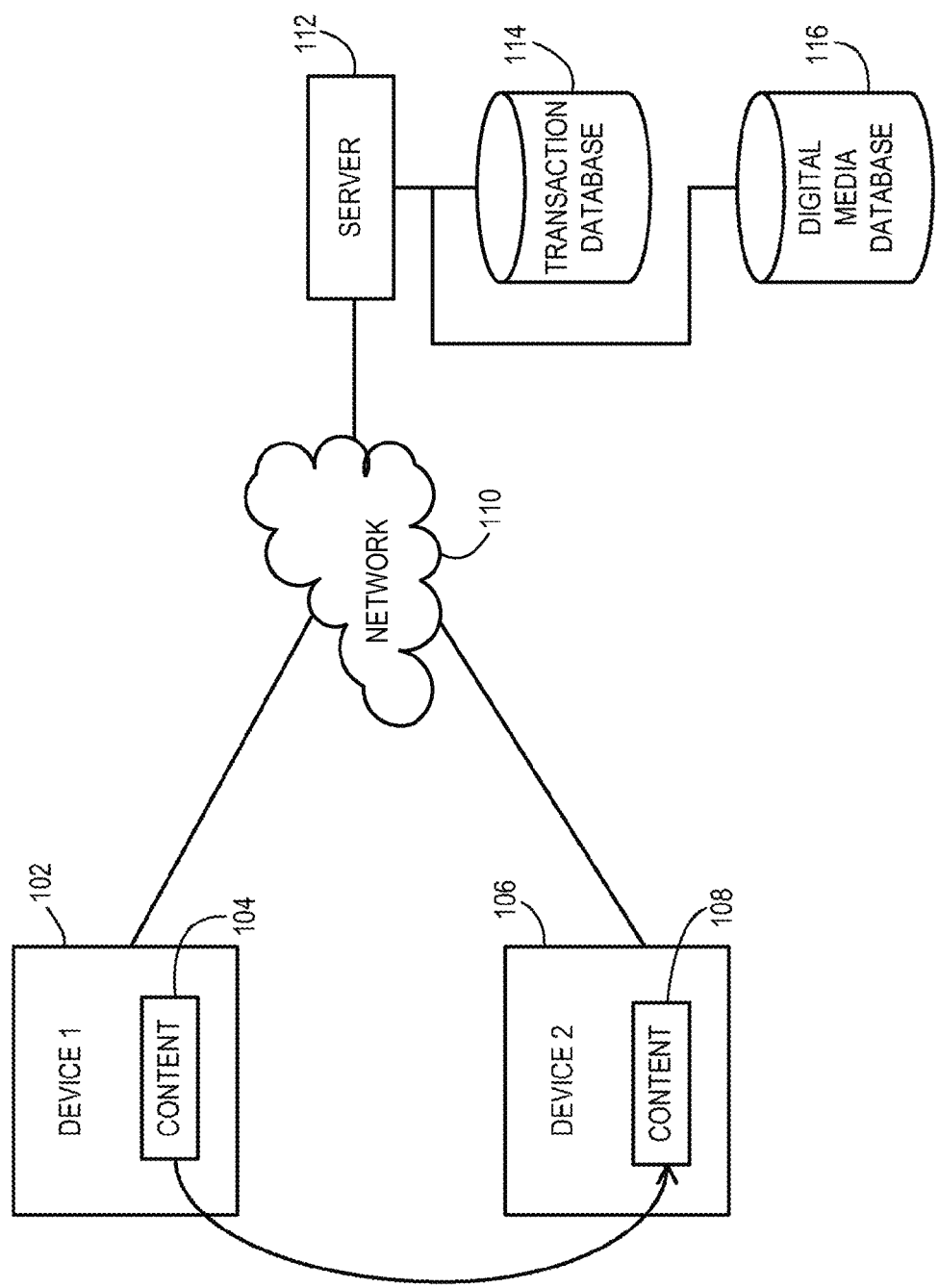
FIG. 1 shows an example of an environment of the brokerage for distribution of digital media including two devices for playback of the digital media and a back-end system for processing the purchases.

FIG. 1 shows an example of the operating environment for the various embodiments. In FIG. 1, a first device 102 of an initial recipient includes content 104 representing one or more digital media files. The initial recipient has previously received the content 104 such as by accessing a digital media distribution server 112 to download the media content and, if required, purchase it. The digital media distribution server 112 maintains a digital media database 116 which contains one or more digital media files that are accessible for download by devices connected to network 110 such as the Internet. The server 112 also maintains a transactional database 114 that maintains a record of the transfers made, and for transfers that are purchases it maintains the form of payment provided for the purchase. The transactional database 114 may interface with various payment mechanisms including conventional clearing houses that process credit card transactions where the digital media is purchased.

FIG. 1 additionally shows a second device 106 of a next purchaser. Presumably, the user of the first device 102 is a peer of the user of the second device 106, and the user of the first device 102 demonstrates the digital media content 104 to the user of the second device 106. In demonstrating the digital media content 104, it is further presumed that the user of the second device 106 becomes interested in the digital media content 104 and wants to obtain a copy for use on the second device 106. At this point, one of various alternative mechanisms for providing a copy 108 of the digital media content 104 to the second device 106 and for providing payment to the user of the first device 102 for the distribution effort is implemented. Each of the various mechanisms is discussed below.

Figure 2:
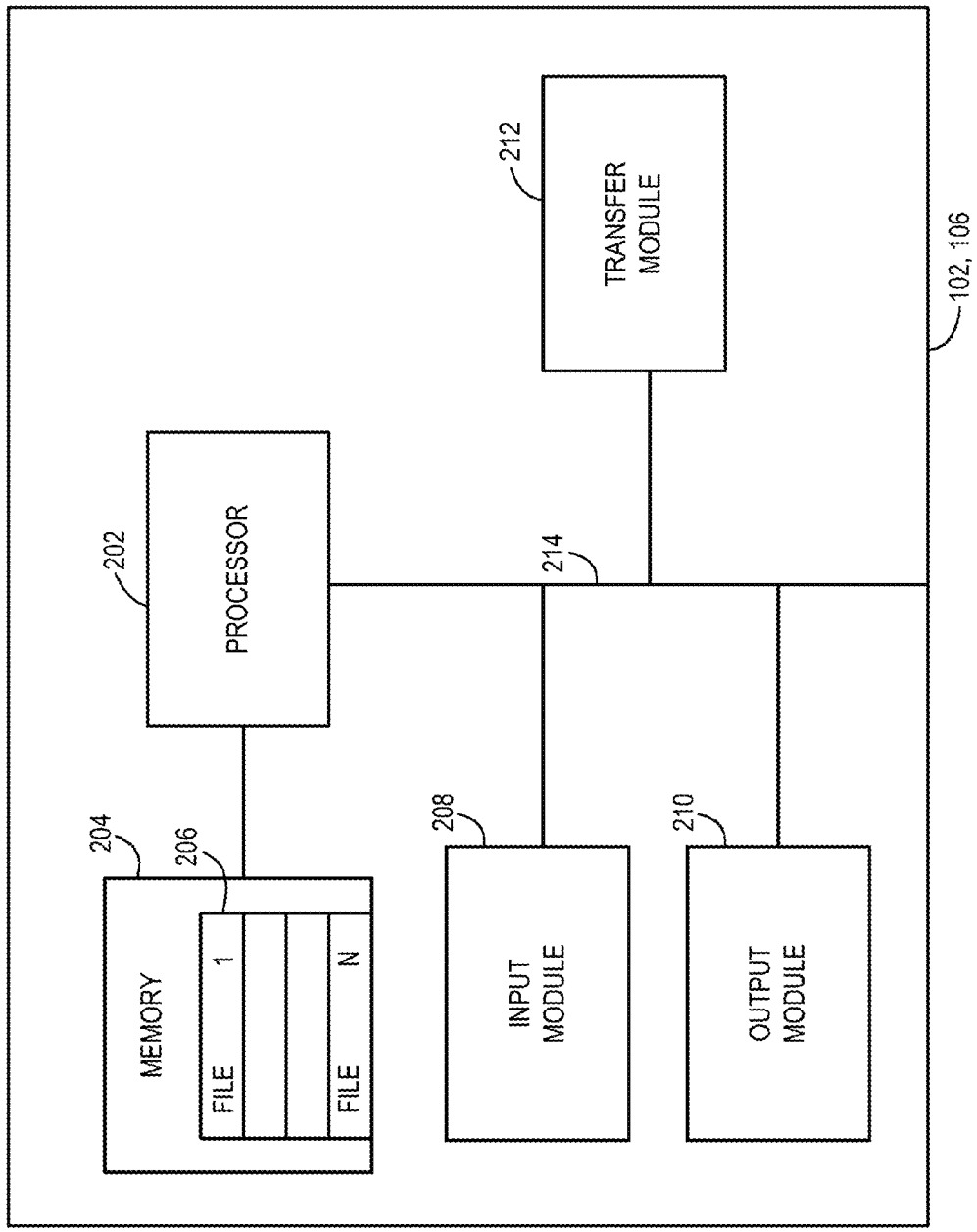
FIG. 2 shows an example of the components of a device of FIG. 1 that allows for playback of the digital media and for generation of transfers and/or sales of the digital media.

FIG. 2 shows an example of the components of the first and second devices 102, 106 of FIG. 1. Devices 102, 106 may include smart phones, personal digital assistants (PDA) with communications capabilities, dedicated music players with communications capabilities, and the like.

The devices 102, 106 have the functionality to playback digital media files and also to send and receive the files and access network addresses in order to complete transfers and purchase transactions. According to one embodiment, the devices 102, 106 have the ability to communicate on a peer-to-peer basis where the digital media file itself may be transferred and/or where a hyperlink for accessing the digital media file may be transferred. Additionally, the devices 102, 106 have the ability to communicate over a networked connection to exchange data with remote network resources such as the server 112 in order to complete purchases for and download the digital media files.

As shown in FIG. 2, the devices 102, 106 include a processor 202 that communicates with various components in order to provide the digital media playback and perform the brokerage functions. The processor 202 implements instructions to perform the necessary logic for performing the playback and brokerage functions, and the instructions may be hard-wired digital logic or firmware. In this example, the processor 202 interacts with the various modules through a data bus 214, but it will be appreciated that one or more of the modules may be incorporated into the processor 202.

A memory module 204 is present in order to store the digital media files 206. The memory module 204 may be of various forms including various forms of read only memory, random access memory, and/or a combination of the two.

The processor 202 and memory 204 are examples of computer readable media which store instructions that when performed implement various logical operations. Such computer readable media may include various forms of storage media including electronic, magnetic, and optical storage. Computer readable media may also include various forms of communications media, such as wired and wireless connections used to transfer the instructions or send and receive other data messages.

An input module 208 allows for users to enter input, including commands for starting playback of digital media as well as for initiating the transfer of digital media files or links thereto to other devices. The input module 208 may include a touch screen, a keypad, buttons, directional pads, and the like.

An output module 210 provides the audio and/or video output that is perceived by the user upon playback of the digital media as well as the graphical user interface, web browser, and other applications provided by the processor 202 for basic operation. The output module 210 may include a display screen such as a liquid crystal display (LCD), one or more speakers, a headphone output, and the like.

A transfer module 212 provides the transfer of data into and out of the device 102, 106. The transfer module 212 of this example may download digital media files via a direct connection to another device or through a network connection to remote resources. Furthermore, the transfer module 212 of this example may upload records of the transaction, either the record for the seller or the record for the buyer, such as the payment method to be used for purchases of digital media. The transfer module 212 may include a wired network interface such as Ethernet, a wireless network interface such as Wi-Fi (or other 802.xx standards) and/or cellular, and may include a peer-to-peer interface such as a wired IEEE 1394 or USB connection or a wireless Bluetooth or infrared connection.

Figure 3A:
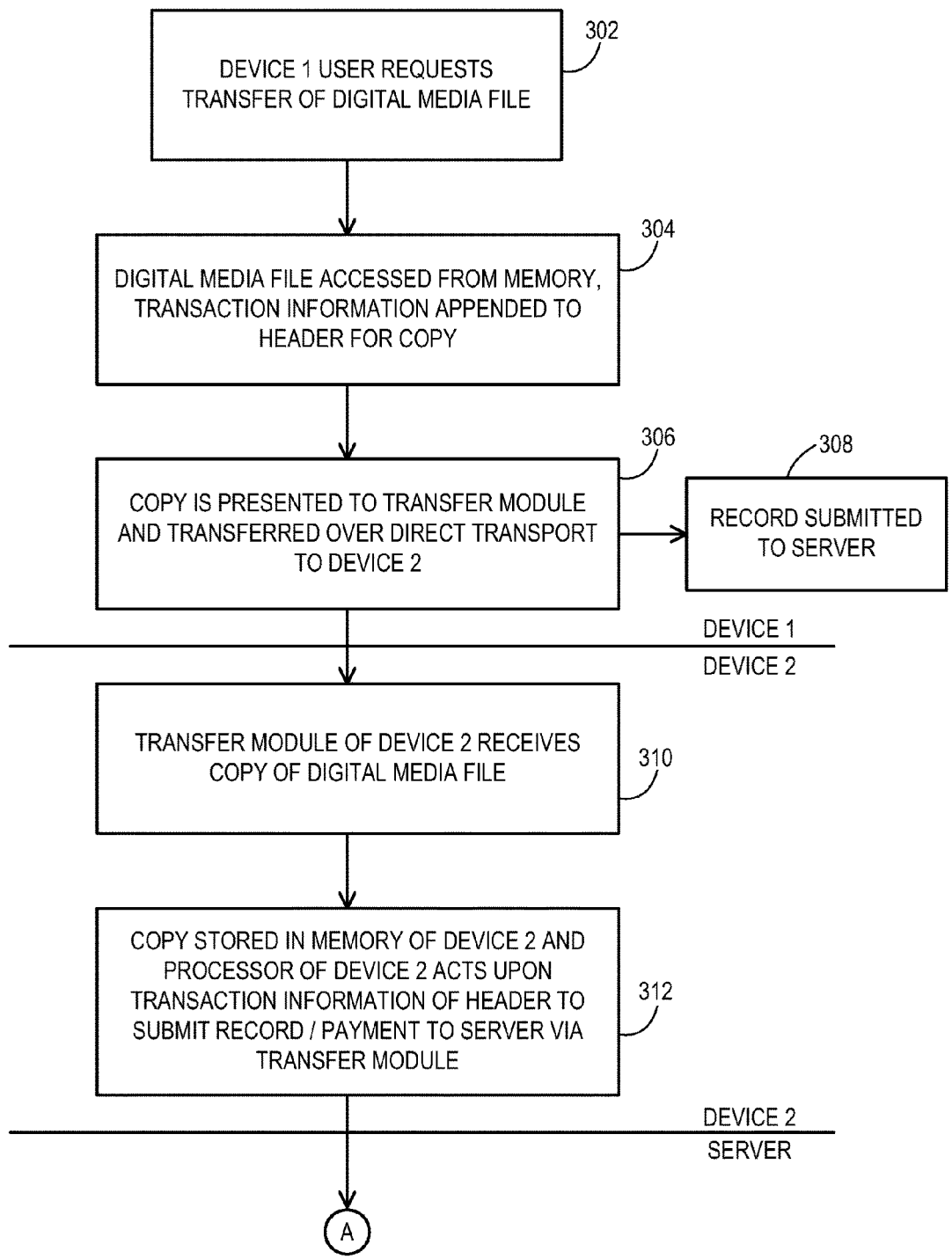
FIGS. 3A and 3B show an example of the operational flow that occurs when transferring an additional copy of digital media from one device to another.
Figure 3B:
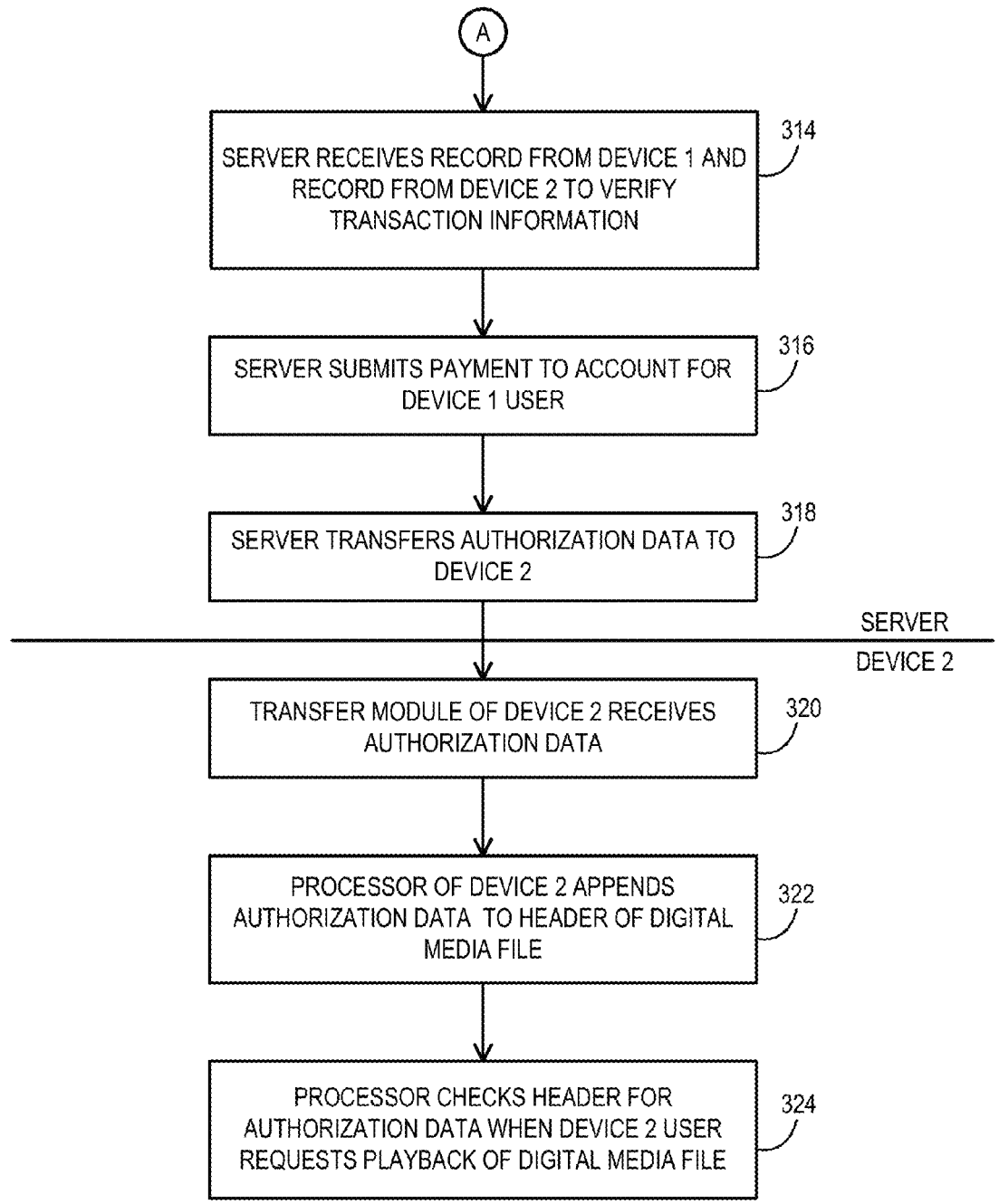

FIGS. 3A and 3B show an example of the operational flow that may occur in the environment of FIG. 1 with the devices 102, 106 utilizing the components of FIG. 2. FIG. 3A begins at a point where device 102 has already obtained, by purchase or otherwise, a copy of digital media from the server 112 or from another device of another broker. This digital media includes media data, discussed in more detail below with reference to FIG. 4, that identifies the digital media and specifies to the processor 202 of device 102 that the digital media is available for a copy to be transferred to another device 104. The media data may specify additional details as well, such as but not limited to: a fixed sales price or limits on the sales price, a grace period during which the transferred copy of the digital media may be played back without yet having been purchased, a limit on the usable lifetime of the digital media for the first device 102, a limit on the lifetime that a copy of the digital media is transferable, and a limit on the usable lifetime for copies of the digital media that are transferred.

It is further presumed in FIG. 3A that the user of the first device 102 has demonstrated the digital media to the user of the second device 106. An additional presumption is that the user of the first device 102 and the user of the second device 106 have reached an agreement regarding a copy of the digital media being provided from the first device 102 to the second device 106 so that the user of the second device 106 has access to a licensed copy for playback. The agreement may involve a sales price that has been agreed to where the digital media at issue doesn't already specify a fixed sales price.

At this point, the user of the first device 102 inputs a request to transfer the digital media file to the second device 106 at request operation 302. The processor 202 of the first device 102 then accesses the digital media file from memory 204 and prepares the digital media file for transmission to the second device 106 at file operation 304. Here, media data that was included in the original digital media file obtained by the user of the first device 102 may be maintained as transaction information for the copy in certain embodiments. Such retained transfer media data may include the identification of the digital media and/or may include usage profile data that controls usage of the digital media at a given device, such as any playback control data including digital rights management (DRM) data, limitations on playback time, playback attempts, and so forth. In other embodiments, some of this transaction information specified by the transfer media data may change, such as the identification data that forms the basis for licensing of the digital media and implementation of the DRM, where the copy being created for transfer may have a transfer media data that uniquely identifies it relative to the copy of the initial recipient. Furthermore, in various embodiments, there may be transfer media data that is appended to the digital media file or a portion of the existing data may be modified when transferring the digital media file.

For example, where the transaction is a purchase, the transaction information specified by the transfer media data may include transaction parameters. The transaction parameters may include information such as purchase information that is appended to the existing media data of the copy of the digital media file being transferred. The purchase information may include various elements, including an identification of the seller, billing data such as the sale price, and any other terms negotiated between the user of the first device 102, i.e., the broker or seller, and the user of the second device 106, i.e. the recipient or buyer. The first device 102 may allow for the user to enter terms of the sale to create the purchase information being appended. However, where one or more terms of the sale have been fixed by when the initial copy of the digital media was fixed, these items, this media data may be maintained. Examples of fixed terms may include the sale price, the lifetime of the license for playback of the digital media, the lifetime of the license to be a re-seller or broker of the digital media, etc.

Figure 4A:
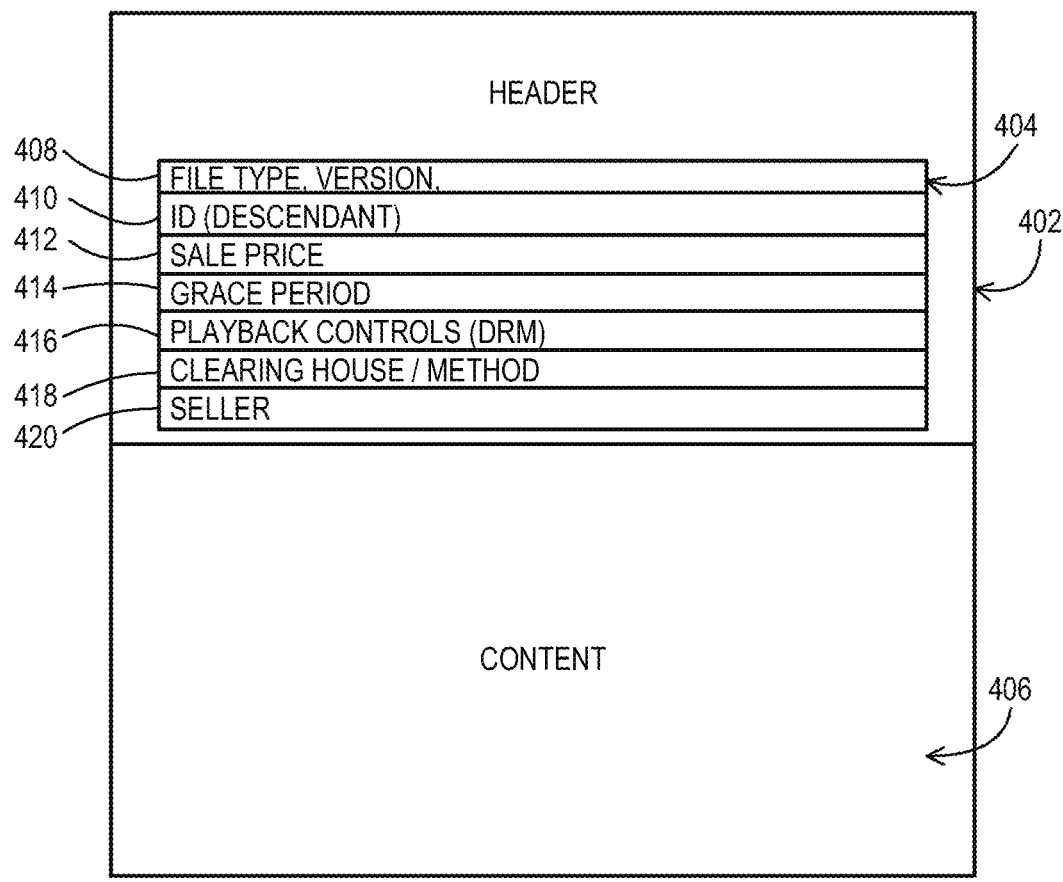
FIG. 4A shows an example of the digital media format for transfer from one device to another.

FIG. 4A shows an example of the digital media file contents once the processor 202 of the first device 102 has prepared the copy of the digital media file for transfer to the second device 106. The copy 402 of the digital media file includes a header portion 404 as well as the digital content portion 406. The header portion 404 is analyzed when playback of the digital media file 402 is requested to allow for various determinations. For example, the header 404 may be analyzed to determine the proper playback mode such as audio versus audio/video, compatibility with digital media players being implemented by the processor, and whether the current user has the license to playback the digital media file on the present device. The digital content portion 406 is where the data content to be played back is located.

The header 402 of this example includes various fields and corresponding media data stored within those fields. Field 408 includes data specifying the file type, the version, and the like to enable the processor to properly play back the contents. This field allows the processor 202 to utilize the correct settings and/or play back application for play back of the contents.

Field 410 provides transfer media data that includes an identification of the digital media file that serves to identify the digital media file for licensing and/or tracking purposes. The identification may be a serial number or similar character string that allows the digital media file to be tracked and distinguished relative to other digital media files that may have the same content but have different serial numbers. Furthermore, field 410 may include a serial number indicating that the present copy 402 is a descendant of a digital media file previously purchased, such as by using a "0.01" or similar scheme. Identifying the digital media file as a descendant allows tracking of the transfer of copies of digital media files from brokers, where each descendant file is indicative of a sale through a broker as opposed to a sale through normal channels of distribution. The digital media file may be identified as a descendant of an original copy purchased through a normal channel, such as by using "0.01" or identified as a descendant of a descendant, such as by using "0.01.01" and in this manner the identifier distinguishes the digital media file from the original copy while still indicating a relationship to the original copy.

The header 402 may include additional fields of information such as field 412 where the sales price is located for instances where the digital media is purchased. Again, the sales price may result from negotiations whereby the user of the first device 102 enters the agreed upon sales price, or the sales price may be fixed such that field 412 is directly copied from the originally purchased copy of the digital media file by the processor 202 or may be populated by the processor 202 based on what the sales price for a descendant copy must be.

Field 414 may be present to specify a grace period for playback of the digital media file by the second device 106 prior to payment for the digital media file being provided by the user of the second device 106. The grace period may be fixed by the original content provider or alternatively may be negotiated between the broker and the buyer. The grace period may be specified in terms of a set expiration date relative to the date when the copy 402 is transferred, may be a set number of times the digital media file may be played back, or some other manner of limiting playback.

Field 416 specifies the playback controls or DRM for the copy 402. This field 416 may be required to contain certain data, referred to as authorization data, in order for playback to occur once the grace period has ended. This authorization data represents to the DRM logic that the copy 402 is a valid licensed copy. The authorization data is absent or otherwise inaccessible within the second device 106 upon the initial transfer but may be provided to the second device 106 for inclusion in field 416 upon payment being received by the user of the second device 106. DRM logic is a manner of preventing unauthorized use, the details of which are disclosed in U.S. Pat. Nos. 7,120,250 and 7,103,574, both of which are incorporated herein by reference in their entirety.

Field 418 may be included to provide data that specifies how the transaction can be recorded and, in the case of a purchase, how payment is made in order for the authorization data to be provided. This data may specify a clearing house for receiving payment and the method for submitting it. Such data may specify a network address that may be accessed by the second device 106 upon an option to complete the purchase being provided to and selected by the user of the second device 106.

Field 420 may be included to specify information about the broker, or user of the first device 102, who is transferring the copy to the user of the second device 106. This field 420 may include an identification of the broker, such as a name or broker number. It may further specify additional information such as when the broker completed the transfer to the second device 106. This information may be used to supplement the identification data from field 410 when the record of the transaction is being submitted to the back-end server 112. The identification of the broker in the record of the transaction, discussed in more detail below with reference to FIG. 4B, allows the back-end server 112 to track transfers including sales by the broker and to compensate the broker accordingly.

Returning to FIG. 3A, once the processor 202 of the first device 102 has completed preparing the copy of the digital media file for transfer, the copy is then presented to the transfer module and is transferred over a direct transport to the second device 106 at transfer operation 306. As discussed above, the direct transport may be through one of various types of transport mechanisms, including wired or wireless.

The processor 202 of the first device 102 then submits a record of the transaction to the back-end server 112 or other network location at record operation 308. The field 418 may be referenced to determine the network address where the record of the transaction is submitted. The record of the transaction allows the back-end server 112 to process the transaction as necessary to receive payment, license the transferred copy, and compensate the broker.

Figure 4B:
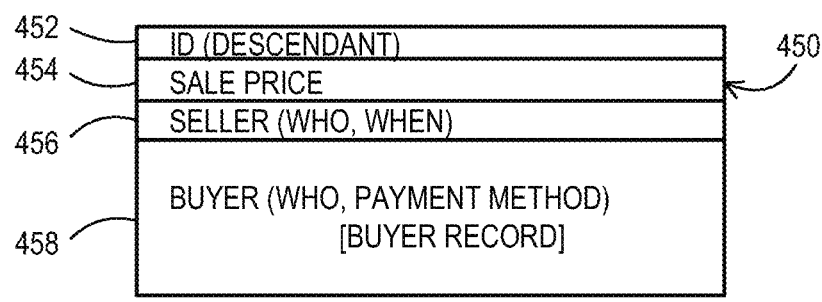
FIG. 4B shows an example of a record of the transaction where the digital media format of FIG. 4A has been transferred.

An example of the record of the transaction is shown in FIG. 4B. The record 450 is a data file that includes various fields of information, including at least a portion of the information included in the media data header 404 of the copy 402 that has been transferred to the second device 106. The record submitted by the first device 102 in this example includes field 452 which includes the identification of the digital media that has been transferred. As discussed above in relation to field 410, this identification information may identify the digital media that has been transferred to be a descendent of a digital media file purchased through normal channels and/or as a descendant of a descendant. Field 454 may be included to indicate the sale price, if any, for the transfer as also specified in field 412, such as the sale price that has been negotiated between broker and buyer or a fixed sale price. Field 456 may be included to further identify the broker as also specified in field 420.

Field 458 provides information about the recipient of the transfer. For example, field 458 may identify the recipient such as by name and may also identify the method of payment specified by the recipient where a purchase is taking place. However, field 458 may be omitted from the record submitted by the broker from the first device 102. As discussed below, the second device 106 may also submit a record of the transaction and the record submitted by the second device 106 may include all of the fields shown in FIG. 4B including the field 458. The back-end server 112 may utilize the buyer date of field 458 to complete the transaction and to also enroll the recipient as another broker for the digital media that has been obtained.

Returning to FIG. 3A, after the first device 102 has attempted to transfer the copy of the digital media file, the second device 106 then receives the copy at reception operation 310 through the complementary transfer module 212 of the second device 106. The processor 202 of the second device 106 then stores the digital media file in memory 204 of the second device 106 at record operation 312. Presumably, the user of the second device 106 will then attempt to access the digital media file for playback such that, in accordance with this example, an option may be presented to the user to complete the transaction such as a purchase for the digital media file transfer or continue to utilize the digital media during the grace period if not yet expired. Upon the user of the second device 106 selecting to complete the transaction, the processor 202 of the second device then further acts on the digital media file by parsing the header 404 to obtain the data necessary to generate the record of the transaction 450 and submit it to the proper network address at record operation 312. The buyer information may include the authorization to charge a credit account or to otherwise obtain payment for the transaction where a purchase is occurring.

As shown in FIG. 3B, the server 112 receives the record 450 submitted from the first device 102 and receives the record 450 submitted from the second device 106 at reception operation 314. Upon receiving the two records, the server 112 of this embodiment performs a comparison of the data of the two to verify the transaction information and thereby authorize the transaction when the two records match. This comparison may be performed to ensure that for a given digital media being identified, the sale price asserted by the broker and the sale price asserted by the buyer do not differ and that the transfer actually occurred rather than being fictitious. In receiving both records, the server 112 can detect whether any discrepancies are present that indicate either the broker or the recipient are attempting to manipulate the sale price. The server 112 can maintain records of brokers, recipients, and the number of times a discrepancy has occurred in order to determine whether to ban participants from the brokerage process.

Additionally, the server 112 obtains the buyer information that specifies the method of payment by the recipient where a purchase is occurring, such as a particular credit account to cover the sale price. The server 112 may then determine whether the form of payment is adequate as part of verifying the transaction information.

Once the server 112 has verified that the records match and that the form of payment is valid, the server 112 then submits payment to an account of the broker, i.e., the user of the first device 102 at payment operation 316. For example, the broker may have a bank account, credit card account, or other electronically accessible account where funds can be deposited by the server 112. As an alternative, the server 112 may give the broker credits toward the purchase of additional digital media files, either for direct purchase through normal channels or for purchase from other brokers.

The server 112 also transfers authorization data, e.g., a license code for the serial number or other identifier of the digital media, necessary for the playback of the copy 402 of the digital media to the second device 102 at transfer operation 318. As discussed above, this authorization data is used by the processor 202 implementing the DRM logic to determine that the copy 402 is a valid and licensed copy for the user of the second device 106.

The authorization data sent from the server 112 is received by the second device 106 at reception operation 320. The processor 202 of the second device 106 then appends the authorization data to media data field 416 of the header 404 for the copy 402 stored in memory 204 of the second device 106 at data operation 322. The processor 202 of the second device 106 then checks the header 404 for the authorization data within field 416 when the user of the second device 106 requests playback of that particular digital media file at playback operation 324.

Figure 5:
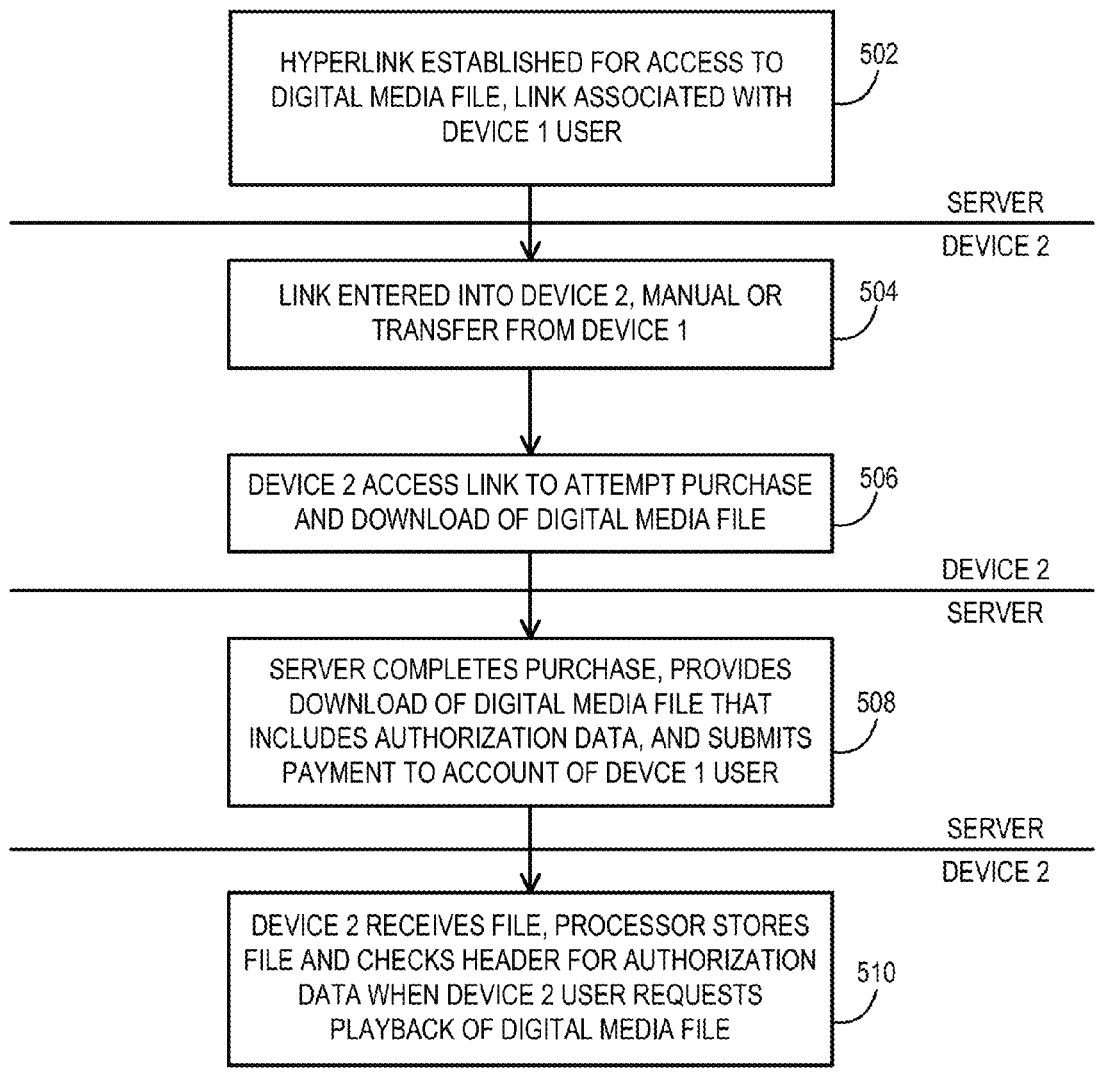
FIG. 5 shows an example of the operational flow that occurs when directing a device to a link associated with the initial purchaser to obtain a copy of the digital media of the initial purchaser.

This discussion of FIGS. 3A and 3B provide for the direct transfer of the digital media file from the first device 102 to the second device 106. As an alternative, the digital media file may instead be made accessible via a dedicated network link such as a hyperlink on the world wide web. FIG. 5 shows one example of an operational flow for providing a brokerage where the transfer occurs via the network link.

The operational flow shown in FIG. 5 begins at a point where device 102 has already received a licensed copy of digital media from the server 112 or from another device of another broker. As with FIG. 3, this digital media may include media data that identifies the digital media but the media data may also specify a network location, e.g., a hyperlink, where a copy of the digital media file may be accessed. The media data may specify additional details as well, such as but not limited to a fixed sales price or limits on the sales price.

It is further presumed in FIG. 5 that the user of the first device 102 has demonstrated the digital media to the user of the second device 106. An additional presumption is that the user of the first device 102 and the user of the second device 106 have reached an agreement regarding a copy of the digital media being accessed by the second device 106 from the network location as specified in the media data or otherwise known by the broker so that the user of the second device 106 has access to a licensed copy for playback. The agreement may involve a sales price that has been agreed to where the digital media at issue does not already specify a fixed sales price.

Prior to the broker having demonstrated the digital media to the user of the second device 102, the server 112 at network operation 502 establishes the hyperlink for access to a copy of the digital media file that has been purchased by the user of the first device 102, i.e., the broker. The hyperlink may be associated with the broker so that when the hyperlink is accessed, the identity of the broker need not be presented since accessing the hyperlink already brings to light the broker to be compensated.

Upon the user of the first device 102 and the user of the second device 106 reaching an agreement, the hyperlink is entered into the second device 106 in order for the second device 106 to access the copy of the digital media file at input operation 504. The link may be entered manually, such as by the user of the first device 102 telling the user of the second device 106 what the link is so that the user of the second device 106 then manually enters the link. Alternatively, the link may be stored either as part of the media data of the digital media file on the first device 102 or is otherwise stored on the first device 102 and is transferred via the transfer module from the first device 102 to the second device 106.

As discussed above, where a purchase is occurring, the agreement may involve a negotiation for a sale price or the sale price may be fixed. Where there is a negotiation, the sale price may be entered by the user of the first device 102 via an input field provided by the processor 202 and the sale price may then be included in a record of the transaction as shown in FIG. 4B where the record is then submitted to the server 112 via an address specified in the media data. The sale price may also be transferred to the second device 106 in the same manner as transferring the link, or the user of the second device 106 may enter it manually in a field provided by the processor 202 of the second device 106.

The user of the second device 106 may then instruct it to access the hyperlink, or the hyperlink may be automatically accessed as a result of the transfer of the hyperlink to the second device 106. Upon accessing the link, the server 112 may communicate with the second device 106 in order to receive payment and buyer details to purchase the digital media. According to one or more embodiments, the initial visit to the hyperlink may instead involve selecting an option to download the digital media file for use during a grace period prior to completing the transaction for the digital media file transfer. In that case, the digital media file like file 402 of FIG. 4A that is downloaded includes a grace period specified in field 414 but may lack the authorization data necessary for field 416. Upon accessing the hyperlink, the second device 106 may also submit a record of the transaction like that shown in FIG. 4B to the server 112 to specify the sale price asserted by the buyer.

Upon the second device 106 accessing the hyperlink to complete the purchase, the server 112 then completes the purchase based on the record of the transaction including the payment method of the buyer at purchase operation 508. If the buyer is purchasing the digital media on the first visit to the hyperlink, as opposed to only downloading the digital media for playback during a grace period, then the digital media file is provided with the authorization data present in field 416. If the buyer is purchasing the digital media on a subsequent visit after having already downloaded the digital media file for purposes of playback during a grace period, then either a replacement version of the digital media file that includes authorization data is provided for download or the authorization data is provided for download so that it can be appended to field 416 for the copy already in memory 204 of the second device 106. Upon the user of the second device 106 completing the payment, the server 112 also posts the payment to the broker in an electronically accessible account.

Once the licensed copy of the digital media file has been downloaded, the processor 202 of the second device 106 stores the digital media file in memory 204, including the authorization data indicating that it is a licensed copy for the user of the second device 106. The user of the second device 106 may then request playback of the digital media file, and the processor 202 of the device 106 then checks the header 404 to find the authorization data and begins playback at playback operation 510.

As further illustration of applications, devices, and systems which may benefit from the embodiments disclosed herein, the following references are incorporated herein by reference in their entirety: U.S. Published Application 20060167882 entitled Digital Rights Management System Architecture; The Business of Streaming and Digital Media by Dan Rayburn and Michael Hoch ISBN: 0240805984; Electronic Commerce, Seventh Annual Edition by Gary Schneider ISBN: 1418837032; Mobile Commerce Application Development by Lei-da Chen and Gordon Skelton ISBN: 1591406021; and Mobile Media and Applications, From Concept to Cash: Successful Service Creation and Launch by Christoffer Andersson ISBN: 0470017473.

While embodiments have been particularly shown and described, it will be understood by those skilled in the art that various other changes in the form and details may be made therein without departing from the spirit and scope of the invention.

What is claimed is:

1. A system, comprising:
   a memory that stores instructions;
   a processor that executes the instructions to perform operations, the operations comprising:
      establishing, within a first copy of digital media, a link indicating a network location for accessing an additional copy of the digital media, wherein the link is a hyperlink;
      accessing the first copy of the digital media including the link indicating the network location for accessing the additional copy of the digital media;
      receiving media data that specifies a limit on a lifetime that a second copy of the digital media is transferable to a device from an initial device that received the first copy of the digital media;
      receiving, from the device, a request for the digital media;
      providing, in response to the request, the link to the device;
      providing, to the device and in response to the device accessing the link, the second copy of the digital media and transfer media data that includes a character string that identifies the second copy of the digital media as a descendant of the first copy of the digital media, wherein the second copy of the digital media is provided to the device via a peer-to-peer connection to a peer-to-peer interface of a different device that generated the second copy of the digital media from the first copy of the digital media, wherein the different device corresponds with the network location indicated in the link;
      implementing, by utilizing the processor, a digital media player;
      determining, based on a header of the second copy of the digital media, compatibility of the second copy of the digital media with the digital media player being implemented by the processor;
      downloading, to the device, authorization data for enabling playback of the second copy of the digital media on the device via the digital media player; and
      appending, to the header of the second copy of the digital media stored in the device, the authorization data for enabling playback of the second copy of the digital media on the device via the digital media player, wherein upon receiving a playback request at the device, the header of the second copy of the digital media is analyzed for the authorization data to initiate playback of the second copy of the digital media.

2. The system of claim 1, wherein the operations further comprise determining that the device is accessing the link.

3. The system of claim 1, wherein the operations further comprise receiving a command for starting playback of the first copy of the digital media.

4. The system of claim 1, wherein the operations further comprise generating, in response to the request, the second copy of the digital media.

5. The system of claim 1, wherein the operations further comprise providing a transaction record that indicates that the second copy of the digital media was provided to the device.

6. The system of claim 1, wherein the operations further comprise determining, based on the header of the second copy of the digital media, a playback mode for the second copy of the digital media.

7. The system of claim 1, wherein the media data specifies authorization of playback of the first copy of the digital media.

8. The system of claim 1, wherein the operations further comprise receiving an indication from a server associated with the link, wherein the indication indicates that the device accessed the link.

9. The system of claim 1, wherein the operations further comprise providing, to the device, a limitation on a period of playback for the second copy of the digital media.

10. The system of claim 1, wherein the transfer media data includes an identity that identifies a broker for the second copy of the digital media.

11. A method, comprising:
establishing, within a first copy of digital media, a link indicating a network location for accessing an additional copy of the digital media, wherein the link is a hyperlink;
accessing the first copy of the digital media including the link indicating the network location for accessing the additional copy of the digital media;
receiving media data that specifies a limit on a lifetime that a second copy of the digital media is transferable to a device from an initial device that received the first copy of the digital media;
receiving, from the device, a request for the digital media;
providing, in response to the request, the link to the device;
providing, to the device and in response to the device accessing the link, the second copy of the digital media and transfer media data that includes a character string that identifies the second copy of the digital media as a descendant of the first copy of the digital media, wherein the second copy of the digital media is provided to the device via a peer-to-peer connection to a peer-to-peer interface of a different device that generated the second copy of the digital media from the first copy of the digital media, wherein the different device corresponds with the network location indicated in the link;
implementing, by utilizing instructions from a memory that are executed by a processor, a digital media player;
determining, by utilizing instructions from the memory that are executed by the processor and based on a header of the second copy of the digital media, compatibility of the second copy of the digital media with the digital media player being implemented by the processor;
downloading, to the device, authorization data for enabling playback of the second copy of the digital media on the device via the digital media player; and
appending, to the header of the second copy of the digital media stored in the device, the authorization data for enabling playback of the second copy of the digital media on the device via the digital media player, wherein upon receiving a playback request at the device, the header of the second copy of the digital media is analyzed for the authorization data to initiate playback of the second copy of the digital media.

12. The method of claim 11, wherein the transfer media data specifies playback control for the second copy of the digital media.

13. The method of claim 11, wherein the transfer media data specifies a limitation on playback time for the second copy of the digital media.

14. The method of claim 11, wherein the transfer media data specifies a number of attempts for playing the second copy of the digital media.

15. The method of claim 11, further comprising determining that the device is accessing the link.

16. The method of claim 11, further comprising determining, based on the header of the second copy of the digital media, a playback mode for the second copy of the digital media.

17. The method of claim 11, further comprising receiving an indication from a server associated with the link, wherein the indication indicates that the device accessed the link.

18. The method of claim 11, wherein the transfer media data includes an identity that identifies a broker for the second copy of the digital media.

19. The method of claim 11, further comprising receiving a credit for obtaining additional digital media.

20. A computer-readable device comprising instructions, which, when loaded and executed by a processor, cause the processor to perform operations, the operations comprising:
establishing, within a first copy of digital media, a link indicating a network location for accessing an additional copy of the digital media, wherein the link is a hyperlink;
accessing the first copy of the digital media including the link indicating the network location for accessing the additional copy of the digital media;
receiving media data that specifies a limit on a lifetime that a second copy of the digital media is transferable to a device from an initial device that received the first copy of the digital media;
receiving, from the device, a request for the digital media;
providing, in response to the request, the link to the device;
providing, to the device and in response to the device accessing the link, the second copy of the digital media and transfer media data that includes a character string that identifies the second copy of the digital media as a descendant of the first copy of the digital media, wherein the second copy of the digital media is provided to the device via a peer-to-peer connection to a peer-to-peer interface of a different device that generated the second copy of the digital media from the first copy of the digital media, wherein the different device corresponds with the network location indicated in the link;

implementing, by utilizing the processor, a digital media player;

determining, based on a header of the second copy of the digital media, compatibility of the second copy of the digital media with the digital media player being implemented by the processor;

downloading, to the device, authorization data for enabling playback of the second copy of the digital media on the device via the digital media player; and appending, to the header of the second copy of the digital media stored in the device, the authorization data for enabling playback of the second copy of the digital media on the device via the digital media player, wherein upon receiving a playback request at the device, the header of the second copy of the digital media is analyzed for the authorization data to initiate playback of the second copy of the digital media.

* * * * *